United States Patent [19]

Marquino et al.

[11] Patent Number: 5,120,493
[45] Date of Patent: Jun. 9, 1992

[54] FORCED-CIRCULATION REACTOR WITH ENHANCED NATURAL CIRCULATION

[75] Inventors: Wayne Marquino; Irvin R. Kobsa; James R. Pallette, all of San Jose, Calif.

[73] Assignee: General Electric Company, San Jose, Calif.

[21] Appl. No.: 716,024

[22] Filed: Jun. 13, 1991

Related U.S. Application Data

[63] Continuation-in-part of Ser. No. 553,073, Jul. 10, 1990.

[51] Int. Cl.⁵ .............................................. G21C 7/32
[52] U.S. Cl. ........................... 376/278; 376/210; 376/395; 376/399; 376/373; 376/377
[58] Field of Search ............... 376/278, 210, 207, 273, 376/275, 373, 377, 395, 399, 406, 407

[56] References Cited

U.S. PATENT DOCUMENTS

| | | | |
|---|---|---|---|
| 3,212,985 | 10/1965 | Hackney | 376/377 |
| 3,429,775 | 2/1969 | Petersen | 376/377 |
| 5,073,335 | 12/1991 | Townsend | 376/373 |

Primary Examiner—Brooks H. Hunt
Assistant Examiner—Frederick H. Voss
Attorney, Agent, or Firm—Robert R. Schroeder

[57] ABSTRACT

A forced-circulation boiling-water reactor includes bypass check valves between a downcomer and a core inlet plenum. When the recirculation pumps are operating at full capacity, there is a maximum pressure differential from the downcomer to the core inlet plenum. This pressure differential keeps the valves closed so that recirculating fluid is constrained to flow through the pumps. When the pumps are not operating, a driving water head in the downcomer forces the valves open, augmenting the flow cross section between the downcomer and the core inlet plenum, enhancing natural circulation. The enhanced natural circulation provides greater core stability during pump shutdown. The valves are selected or adjusted so that they open when the pressure differential falls through a predetermined range to augment diminished pumping capacity with a higher natural circulation flow rate.

6 Claims, 4 Drawing Sheets

FORCED-CIRCULATION REACTOR WITH ENHANCED NATURAL CIRCULATION

This is a continuation-in-part of pending U.S. patent application Ser. No. 07/553,073, filed Jul. 10, 1990.

BACKGROUND OF THE INVENTION

The present invention relates to energy generation systems and, more particularly, to a forced-circulation dual-phase reactor. A major objective of the present invention is to provide for enhanced core neutron power stability during pump shutdowns in a forced-circulation boiling-water reactor (FCBWR).

Dual-phase reactors store heat generated by the core primarily in the form of vapor pressure generated by the vaporizing of a liquid heat transfer medium. The vapor pressure can be used to rotate a turbine that drives a power output generator to produce electricity. In a dual-phase reactor, energy from the core vaporizes liquid so that some of the heat energy generated by the core is stored in the form of the phase conversion from liquid to vapor. The predominant type of dual-phase reactor is the boiling-water reactor (BWR). Accordingly, much of the following discussion concerning BWRs is readily extrapolated to other dual-phase reactors. In a single-phase reactor, the fluid remains liquid, and the energy generated by the core is stored primarily in the form of elevated temperatures. Liquid-metal reactors define one type of single-phase reactor.

In a BWR, heat generated by nuclear fission in a core can be used to boil water to produce steam. Water passing through the core without being vaporized is recirculated within a reactor vessel to provide a continuous flow of water through the core. The steam that is generated can be separated from the water and transferred from the reactor vessel to deliver energy. For example, the steam can be used to drive a turbine, which in turn can be used to drive a generator to produce electricity. In the process, the steam condenses and can be returned to the vessel. The condensate is merged with the internally recirculated water and continues to aid heat transfer.

BWRs can be distinguished by the means employed to recirculate the water within the reactor vessel. Forced-circulation boiling-water reactors (FCBWRs) rely primarily on pumps to drive the water along a recirculation path. Natural-circulation boiling-water reactors (NCBWRs) rely primarily on the driving force provided by the density difference between the downcomer and the steam column above the core. NCBWRs have the advantage of simplicity. However, their inherently lower pumping capacity limits reactor power output. Accordingly, the largest capacity BWRs are all FCBWRs. The distinction between FCBWRs and NCBWRs notwithstanding, FCBWRs are preferably designed to take advantage of natural circulation to allow decay heat to be removed from the core in the event the pumps are shut down.

In both types of BWRs, the core is immersed in water. Water flowing up through the core is partially converted to steam. To promote natural circulation, water rising up from the core is guided vertically to promote steam-water separation and to support a relatively low-density steam/water head above the core. Water recirculates down a downcomer annulus between the reactor vessel and the chimney and core. The water in the downcomer is denser than the steam and water mixture in the core and chimney region. The difference in density forces circulation up through the core and chimney and down through the downcomer.

One reason natural-circulation provides for limited power output is that its limited circulation rates can provide more time than is optimal for the water flowing through the core to be converted to steam. The excess boiling results in a larger volume of steam in the core. This larger steam volume adversely affects core stability, as the stability-decay ratio of the nuclear fission rate is dependent on the ratio of two-phase pressure drop to single-phase pressure drop. In ratio of two-phase pressure drop to single-phase pressure drop. In NCBWRs, this problem is addressed by limiting the amount of heat generated by the core, and thus the power output of the reactor.

FCBWRs, on the other hand, are typically designed so that they exceed the power output that would be available using natural circulation alone. Total pumping power failure in an FCBWR operating at full capacity could result in excess boiling and core instability. This scenario is addressed by providing several independent pumps so that the likelihood of total pumping power failure is minimized.

Despite the levels of safety afforded by redundant pumping, there is still value in enhancing the throughput due to natural circulation in an FCBWR. Natural circulation is especially attractive as a safety backup due to its independence from active components. Thus, improvements in natural circulation are highly desirable in the context of FCBWRs.

SUMMARY OF THE INVENTION

In accordance with the present invention, an FCBWR includes valve means for opening a pump bypass as the pressure differential from upstream of the recirculation pumps to downstream of the same falls through a predetermined range. The bypass is closed while recirculation pumps are fully operational. When the pressure differential drops below the predetermined range (as would occur in the event of a pump shutdown), the bypass is opened, increasing the fluid flow path cross section and thus enhancing natural circulation. The invention also provides for the closing of said bypass in response to a pressure differential exceeding the threshold range.

This invention is employed in the context of an FCBWR that has a mechanical steam separator with vertical elements capable of serving as a chimney supporting a buoyancy head above a reactor core. Pumps are located in the fluid return path, e.g., a downcomer.

Control of the bypass can be in response to changes in the pressure differential induced by the pumps. When operating, the pumps generate a positive pressure differential so that the pressure downstream of the pump is greater than the pressure upstream of the pump. This pressure differential diminishes when the pumping power is decreased, and becomes negative when the pumps are shutdown completely. Preferably, a check valve can be used to control a bypass. The check valve is to be closed when the pressure differential exceeds the predetermined range, indicating adequate pumping.

The bypass valves should open as the pressure differential across the pumps falls from a minimal pressure differential associated with a minimal pumping rate toward a pressure differential associated with natural circulation when the pumps are off. Preferably, the valves close as the pressure differential rises through the same pressure-differential range.

A major advantage of the present invention is that core neutron power stability is enhanced in the event of a pump shutdown. Enhanced stability is achieved since enhanced natural circulation decreases the ratio of the two-phase pressure drop to the one-phase pressure drop in the core. This in turn improves the stability-decay ratio of the nuclear fission rate, and thus, core neutron power stability.

Since the bypasses are closed during full operation, there is no impairment of reactor power capacity or functioning. The invention is compatible with existing FCBWRs and does not require significant redesign efforts. The invention can respond automatically to pump power failures without relying on active feedback systems. Thus, the invention provides for reliable and effective response to reduction in forced recirculation. These and other features and advantages of the present invention are apparent in the following description with reference to the drawings below.

DESCRIPTION OF THE PREFERRED EMBODIMENTS

Figure 1:
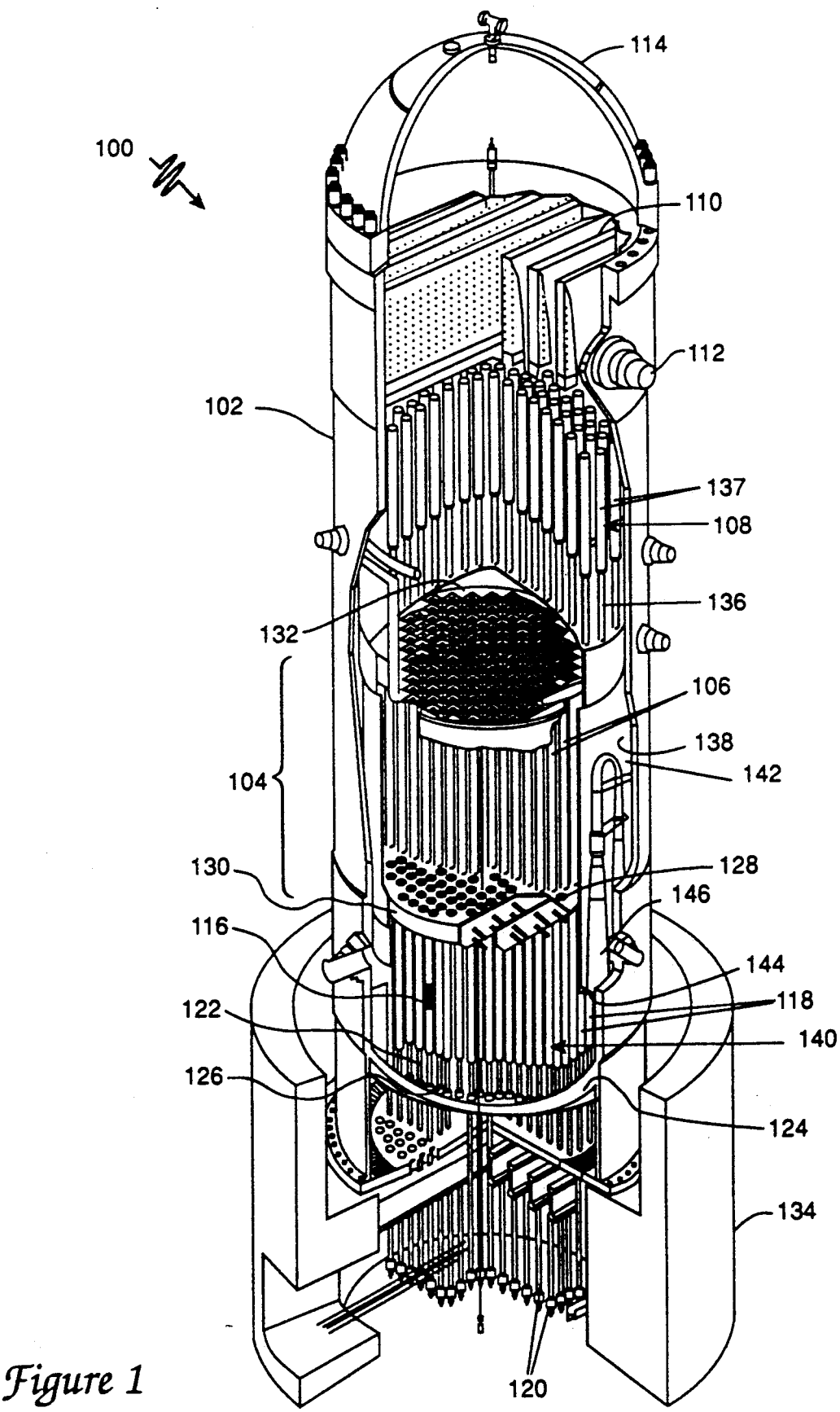
FIG. 1 is a cutaway perspective of a forced-circulation boiling-water reactor in accordance with the present invention.

In accordance with the present invention, a FCBWR 100 comprises a reactor pressure vessel 102 and its internals, as shown in FIG. 1. Heat is generated within a core 104 of FCBWR 100, which includes fuel bundles 106 of fissionable material. Water circulated up through core 104 is at least partially converted to steam. A steam separator assembly 108 separates steam from water, which is recirculated. Steam separator assembly 108 serves as a chimney in supporting a driving head to promote natural circulation of water within vessel 102. Residual water is removed from the steam by steam dryers 110. The steam then exits reactor through a steam exit 112 near a vessel head 114.

The amount of heat generated in core 104 is regulated by inserting and withdrawing control blades 116, and by varying core flow. To the extent that a control blade 116 is inserted into core 104, it absorbs neutrons that would otherwise be available to promote the chain reaction which generates heat in core 104. Control rod guide tubes 118 below core 104 maintain the vertical motion of control blades 116 during insertion and withdrawal. Hydraulic control rod drives 120 effect the insertion and withdrawal of control blades 116. Control rod drive housings 122 extend through a bottom 124 of vessel 102, where they are welded to stub tubes 126, which are in turn welded to vessel bottom 124. Fuel bundles 106 are supported from below by a fuel support casting 128 mounted on a core support plate 130 located at the base of core 104. A top guide 132 helps align fuel bundles 106 as they are lowered into core 104. Vessel 102 is mounted on a concrete pedestal 134.

The recirculation path within vessel 102 is upward through core 104, upward through stand pipes 136 of separator assembly 108, upward, outward and then downward through steam separators 137 of separator assembly 108, radially outward toward a downcomer 138, downward through downcomer 138, and radially inward through a core inlet plenum 140, and back up to core 104. A shroud 142 encircles core 104 so as to define an inner radial wall of downcomer 138, isolating the fluid flowing downward through downcomer 138 from the steam/water mixture rising through core 104. Shroud 142 extends below core 104 to form a boundary between downcomer 138 and core inlet plenum 140. Shroud 142 extends down to a pump deck 144, on which twenty pumps 146 (one shown, 10-24 are typical) are mounted. Pumps 146 are jet pumps which are driven by external electrically driven pumps, not shown. During forced circulation, the path from downcomer 138 to core inlet plenum 140 is through the inlet suction annulus of jet pumps 146.

Figure 2:
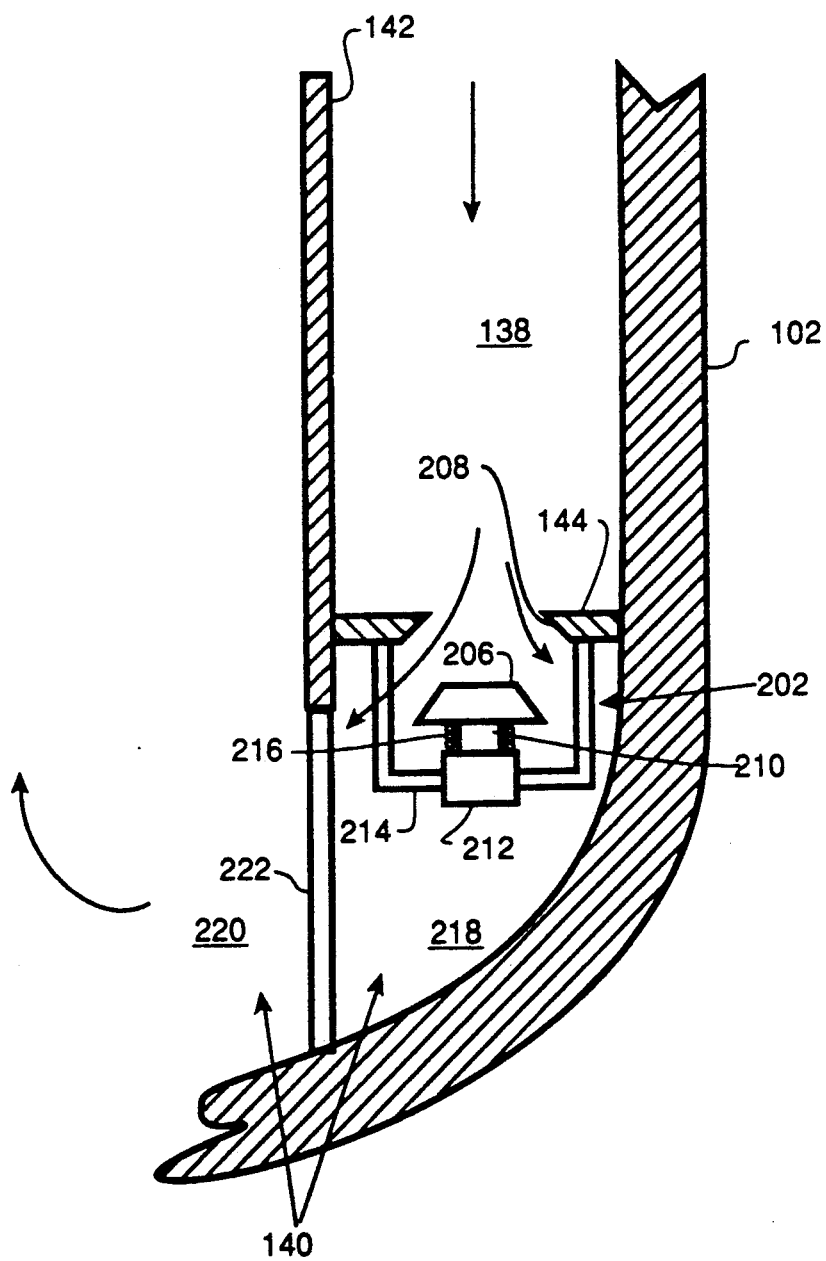
FIG. 2 is a schematic sectional view of the reactor of FIG. 1 showing one type of bypass valve arrangement in accordance with the present invention.

In accordance with the present invention, the flow cross section between downcomer 138 and core inlet plenum 140 is augmented when forced circulation is stopped. To this end, pump bypass valves 202 (one shown) are mounted on pump deck 144, as shown in FIG. 2, circumferentially between adjacent pumps 146 (shown in FIG. 1). Each valve 202 includes a beveled plug 206 for sealing an inversely beveled aperture 208 through pump deck 144. Plug 206 is mounted on a stem 210, which can slide through a sleeve 212. Sleeve 212 is mounted on a mounting bracket 214. Mounting bracket 214 is attached to and extends below pump deck 144. A spring 216 urges plug 206 upward.

Spring 216 is selected so that valve 202 opens as the pressure differential falls below the minimum pressure differential provided by pumps 146 while they are operating and so that valve 202 closes as the pressure differential rises above the maximum pressure differential associated with natural circulation in the absence of pumping. The cross-over range corresponds to a recirculation flow that is roughly one-quarter of capacity. During pumping, the pressure in core inlet plenum 140 substantially exceeds that in downcomer 138. Core inlet plenum 140 includes an outer inlet plenum 218 below pump deck 144 and an inner inlet plenum 220 directly below core 104 (shown in FIG. 1). Shroud supports 222 are sufficiently spaced (circumferentially) that they negligibly restrict flow between outer inlet plenum 218 and inner inlet plenum 220. After pumps 146 are restarted, the rising pressure differential from downcomer 138 to outer inlet plenum 218 acts in concert with spring 216 to force plug 206 against pump deck 144 to close deck valve aperture 208. All recirculating water then flows throught the pump suction.

In the absence of pumping, the pressure increment across deck 144 becomes insufficient to seal aperture 208. Thus, aperture 208 is open to increase the flow cross section across deck 144. Opening aperture 208 augments natural circulation that is permitted by steam columns in steam separator assembly 108. The shutdown threshold at which valve 202 opens can be adjusted by appropriate selection of spring 216.

Figure 3:
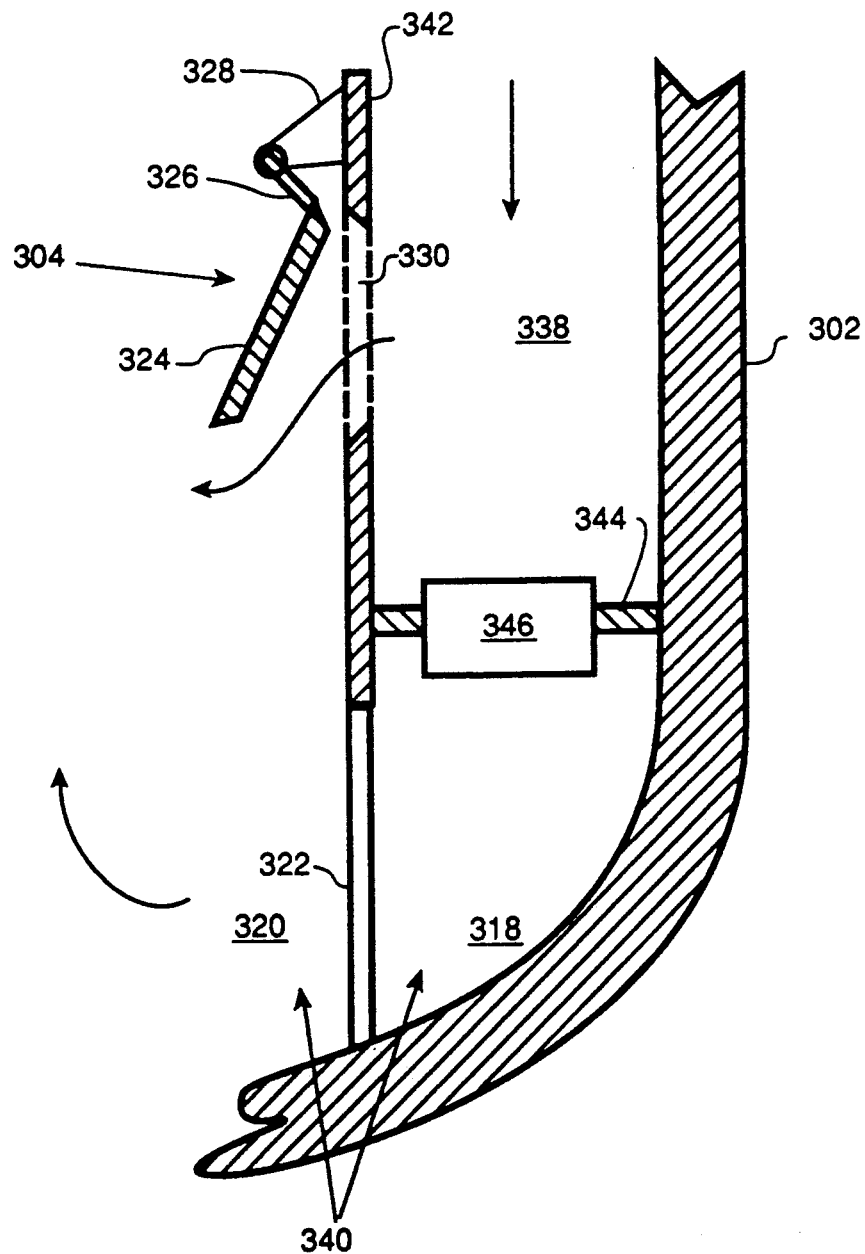
FIG. 3 is a schematic sectional view of a reactor similar to that of FIG. 1 but having a different pump bypass valve arrangement in accordance with the present invention.

In an alternative embodiment of the present invention, a FCBWR similar to FCBWR 100 includes swing valves 304 (one shown) in a shroud 342, as shown in FIG. 3. The similarities between the reactors extend to a vessel 302, a downcomer 338, a core inlet plenum 340, an outer inlet plenum 318, an inner inlet plenum 320, a pump deck 344, and shroud supports 322. (The just-listed components share the last two digits of the reference number with components of the embodiment illustrated in FIG. 2.) Each shroud valve 304 includes a plug 324, a stem 326, and a support 328. Shroud valve 304 is located above deck 344. Stem 326 is rigidly connected to plug 324, with which it pivots on support 328. Plug 324 is beveled to form a seal against aperture 330, which is inversely beveled.

During capacity pumping, the pressure differential between downcomer 338 and inner inlet plenum 320 is sufficient to seal plug 324 against shroud 342 to close aperture 330. In this condition, all circulation is through pump suction. In the absence of pumping, the greater pressure in downcomer 338 relative to that in inner inlet plenum 320 swings plug 324 into inlet plenum 320, opening aperture 330. When open, aperture 330 permits additional coolant to flow from downcomer 338 to inner inlet plenum 320 while bypassing deck 344 and pumps 346. Plug 324 can be designed so that its weight provides for opening and closing at the desired pressure differentials. Alternatively, a counterweight can be mounted on stem 326 and moved to attain the desired response to changing pressure differentials.

Figure 4:
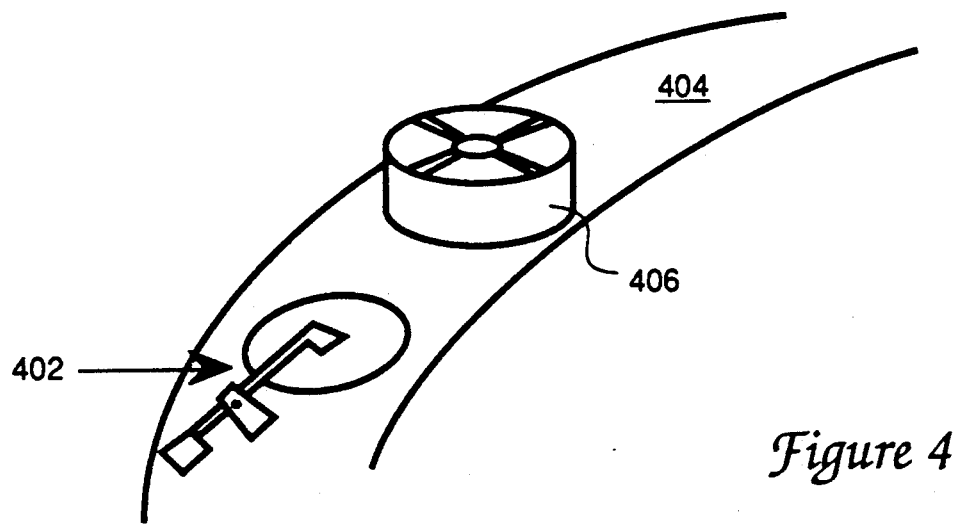
FIG. 4 is a sectional representation of a portion of a reactor similar to that of FIG. 1 but employing internal pumps, as well as an alternative pump bypass valve in accordance with the present invention.
Figure 5:
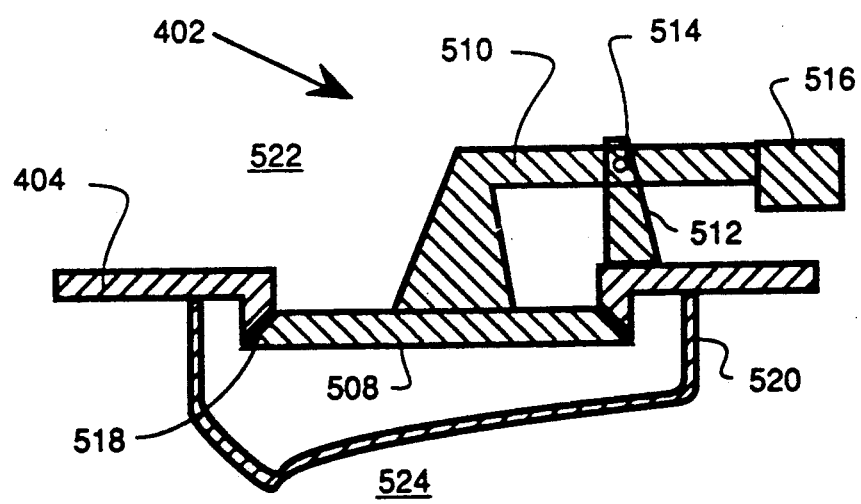
FIG. 5 is a sectional representation of the alternative coolant bypass means of FIG. 4.

An alternative levered deck check valve 402 is shown in FIGS. 4 and 5. Valve 402 is shown mounted on a pump deck 404, on which is also mounted an internal electric-motor-driven pump 406. The illustrated valve 402 and pump 406 represent groups of ten of each (six to twelve are typical). Valve 402 includes a plug 508, a lever 510, a fulcrum 512, a pivot 514, and a counterweight 516. Plug 508 is beveled to seal against an inversely beveled deck aperture 518 from below. A cage 520 is mounted to the bottom of deck 404 to limit the travel of plug 508 when valve 402 opens. Cage 520 also serves to retain any parts that may come loose from the valve. (Comparable cages are preferably provided for valves 202 and 304 in the embodiments described above.)

At capacity pumping, the pressure differential from the downcomer side 522 to the core inlet side 524 of deck 404 seals plug 508 against aperture 518. This constrains recirculating water to flow through pump 406. In the absence of pumping, plug 508 falls against cage 520. With aperture 518 thus open, recirculation can bypass pump 406, augmenting natural circulation. The crossover threshold is set by moving counterweight 516.

While various embodiments of the invention have been described above, those skilled in the art can recognize that other embodiments are provided for. Three valve designs and two pumping schemes have been disclosed. These can be combined in any permutation. The recirculation cross section can be augmented in response to a decrease in pumping in a variety of ways. Generally, any means for increasing flow cross section in response to a decrease in pumping or pressure differential can be used. Active feedback systems are provided for. For example, pressure sensors can monitor the pressures in the downcomer and the core inlet plenum. The pressures can be compared and a valve adjusted accordingly. In general, passive systems are preferred because of their inherent safety and simplicity.

Valves can implement hysteresis so that the downward-going pressure differential at which valves open is below the upward-going differential at which they close. The hysteresis minimizes any unstable behavior that could occur if the valves oscillated between open and closed conditions.

While the desribed embodiments are presented in the context of boiling-water reactors, the present invention also applies to other forced-circulation reactors capable of limited recirculation by natural circulation. While the preferred embodiments provide for closing valves passively once pumps are restarted, the invention provides for an active valve closure to help "jump start" forced circulation. In this case, there is no distinct startup threshold. Thus, dual-phase reactors other than boiling-water reactors are provided for, since such reactors have a vapor phase that can serve as a buoyancy head for natural circulation. These and other modifications to and variations upon the described embodiments are provided for by the present invention, the scope of which is limited only by the following claims.

What is claimed is:

1. A forced-circulation dual-phase reactor comprising:
   a reactor vessel;
   a reactor core disposed within said vessel and defining a core inlet plenum below said core;
   a chimney means disposed above said core for guiding fluid exiting upward from said core along a substantially vertical path so as to support a steam/water column therein;
   a fluid return path from said chimney means to said core inlet plenum;
   pump means for controllably enhancing a pressure differential along said fluid return path so as to urge fluid along said fluid return path for recirculating fluid through said core; and
   valve means for opening a bypass for fluid to flow from said fluid return path to said core inlet plenum without passing through said pump means, said valve means being coupled to said pump means so that said valve means opens said bypass as said pressure differential falls through a predetermined pressure-differential range;
   whereby, in the event of a shutdown of said pump means, said steam/water column urges fluid to recirculate through said bypass, thereby augmenting natural circulation and enhancing core neutron power stability.

2. A reactor system as recited in claim 1 wherein said valve means closes said bypass as said pressure differential rises through said pressure differential range.

3. A reactor system as recited in claim 2 wherein said valve means includes counter force means for urging said valve means closed as said pressure differential rises through said pressure differential range.

4. A forced-circulation boiling-water reactor system comprising:
   a reactor pressure vessel having a cylindrical vessel wall;
   a radioactive core for generating heat, said core being disposed within said reactor pressure vessel and defining a core inlet plenum within said vessel and below said core;

a steam separator assembly for separating steam from water rising from said core, said steam separator assembly supporting a steam/water column;

a cylindrical shroud extending vertically at least partially along the vertical extent of said core to a level below said core, said shroud defining a radially inward boundary of a downcomer, said vessel wall defining a radially outward boundary of said downcomer;

recirculation pump means, including internal components disposed within said vessel, said pump means providing for a pressure differential from said downcomer to said core inlet plenum, said pressure differential being positive when said pump means is operating;

a pump deck located at the base of said downcomer, said internal pump components being mounted on said deck, said deck and said shroud defining a downcomer/plenum boundary between said core inlet plenum and said downcomer;

a downcomer/plenum aperture through said downcomer/plenum boundary; and valve means for opening and closing said aperture, said valve means being responsive to said pressure differential so that:

when said pump means is activated so as to cause said pressure differential to rise through a predetermined range, said valve means closes said aperture, constraining water to flow through said pump deck via said pump means; and when said pump means shuts down so as to cause said pressure differential to fall through said range, said valve means opens said aperture, increasing the amount of water flowing down said downcomer that enters said core inlet plenum without flowing through said pump means so as to augment the natural circulation coolant flow and enhance core neutron power stability.

5. A reactor system as recited in claim 4 wherein said aperture is in said deck.

6. A reactor system as recited in claim 4 wherein said aperture is in said shroud.

* * * * *